(12) United States Patent
Dunne et al.

(10) Patent No.: US 9,094,499 B2
(45) Date of Patent: **\*Jul. 28, 2015**

(54) INFERRING QUALITY IN UT CALLS BASED ON REAL-TIME BI-DIRECTIONAL EXPLOITATION OF A FULL REFERENCE ALGORITHM

(71) Applicant: International Business Machines Corporation, Armonk, NY (US)

(72) Inventors: Jonathan Dunne, Waterford (IE); James Patrick Galvin, Jr., Georgetown, KY (US); David Malone, Maynooth (IE); Patrick Joseph O'Sullivan, Ballsbridge (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/873,690

(22) Filed: Apr. 30, 2013

(65) Prior Publication Data

US 2013/0301810 A1    Nov. 14, 2013

Related U.S. Application Data

(63) Continuation of application No. 13/470,606, filed on May 14, 2012.

(51) Int. Cl.
*H04M 3/22* (2006.01)
*H04L 29/06* (2006.01)

(52) U.S. Cl.
CPC ............. *H04M 3/2227* (2013.01); *H04L 65/80* (2013.01); *H04M 3/2236* (2013.01)

(58) Field of Classification Search
USPC .................. 379/32.01, 41, 68, 88.01, 88.02, 379/142.05, 265.06, 46, 164, 165, 377, 414
See application file for complete search history.

(56) References Cited

U.S. PATENT DOCUMENTS

| 6,763,226 B1 | 7/2004 | McZeal, Jr. |
| 7,095,759 B1 | 8/2006 | Fitzgerald |

(Continued)

FOREIGN PATENT DOCUMENTS

| JP | 2008532416 A | 8/2008 |
| JP | 201062731 A | 3/2010 |
| WO | 2009093244 A2 | 7/2009 |

OTHER PUBLICATIONS

International Search Report and Written Opinion dated Jul. 16, 2013 in PCT/IB2013/053208, pp. 1-7.

(Continued)

*Primary Examiner* — Yosef K Laekemariam
(74) *Attorney, Agent, or Firm* — Holland & Knight LLP; Brian J. Colandreo, Esq.; Jeffrey T. Placker, Esq.

(57) ABSTRACT

A method, computer program product, and computer system for inferring quality of unified telephony calls based on real-time bi-directional exploitation of a full reference algorithm. A client copy of an audio file may be received from a client device associated with a unified telephony call. The client copy of the audio file may be compared to a local copy of the audio file using a reference algorithm. A quality of service associated with the client device may be determined based upon, at least in part, a difference between the client copy of the audio file and the local copy of the audio file.

8 Claims, 3 Drawing Sheets

(56) References Cited

U.S. PATENT DOCUMENTS

| | | |
|---|---|---|
| 7,450,566 B2 | 11/2008 | Wong |
| 7,583,613 B2 | 9/2009 | Klotz et al. |
| 7,707,031 B2 | 4/2010 | Saraby |
| 8,711,202 B2* | 4/2014 | Ranganath et al. ........ 348/14.08 |
| 2002/0193999 A1 | 12/2002 | Keane et al. |
| 2006/0153174 A1* | 7/2006 | Towns-von Stauber et al. ......... 370/356 |
| 2008/0056241 A1 | 3/2008 | Haddad et al. |
| 2011/0007732 A1 | 1/2011 | Ward et al. |
| 2013/0143602 A1* | 6/2013 | Rodriguez et al. ......... 455/456.5 |

OTHER PUBLICATIONS

Anonymous, "PMI Based System and Method to Provide Total QOS in Enterprise Wide Unified Telephony Environments," IP.com PriorArtDatagase, Sep. 12, 2011, pp. 1-3.

Anonymous, "Competitive Disclosure—System and Method to Motivate QOS in Unified Telephony Applications," Aug. 18, 2011, pp. 1-4.

* cited by examiner

INFERRING QUALITY IN UT CALLS BASED ON REAL-TIME BI-DIRECTIONAL EXPLOITATION OF A FULL REFERENCE ALGORITHM

RELATED APPLICATIONS

The subject application is a continuation application of U.S. patent application with Ser. No. 13/470,606, filed on May 14, 2012, the entire content of which is herein incorporated by reference.

TECHNICAL FIELD

This disclosure relates to unified telephony systems and methods.

BACKGROUND

Unified telephony (UT) systems may integrate telecommunications with existing unified communications and collaboration environment. UT systems may provide users with a contact address or phone number, which may be used to reach the user at any device. For example, the UT system may turn a computing device into a soft phone, which permits a user to make and receive phone calls from their computers. Incoming call management, telephony presence, click-to-call, and click-to-conference may be features provided in a UT system.

Participants in a UT system calls may experience quality-of-service (QoS) issues resulting in a poor call experience. Some factors that may contribute to a negative QoS of a UT call may include signal strength, additional router hops in the lines of communications, background noise interference, or the like.

BRIEF SUMMARY

In one implementation, a method may include receiving, by a computing device, a client copy of an audio file from a client device associated with a unified telephony call. The client copy of the audio file may be compared to a local copy of the audio file using a reference algorithm. A quality of service associated with the client device may be determined based upon, at least in part, a difference between the client copy of the audio file and the local copy of the audio file.

One or more of the following features may be included. Receiving the client copy of the audio file may include receiving a first client copy of the audio file from the client device at a first time, and receiving a second client copy of the audio file from the client device at a second time. Comparing the client copy of the audio file to the local copy of the audio file may include comparing first client copy of the audio file to the local copy of the audio file, and comparing the second client copy of the audio file to the local copy of the audio file. The reference algorithm may include a Perceptual Evaluation of Speech Quality algorithm.

The method may also include associating a visual indicator with the quality of service. The visual indicator may be transmitted to one or more client devices associated with the unified telephony call. If the quality of service is above a first threshold indicating a relatively high quality, the visual indicator may be indicative of a high quality of service. If the quality of service is below a second threshold indicating a relatively low quality, the visual indicator may be indicative of a low quality of service. If the quality of service is below the first threshold indicating the relatively high quality and above the second threshold indicating the relatively low quality, the visual indicator may be indicative of a medium quality of service. The visual indicator may be transmitted to a second client device associated with a moderator. If the visual indicator is indicative of a low quality of service, a notification may be transmitted to the client device identifying a problem associated with the unified telephony call.

If the quality of service falls below a threshold a corrective measure may be implemented. In some embodiments, failover connection information may be received from the client device prior to joining the unified telephony call. Implementing the corrective measure may include establishing a failover connection based upon, at least in part, the failover connection information.

According to another implementation, a computer program product resides on a computer readable medium that has a plurality of instructions stored on it. When executed by a processor, the instructions cause the processor to perform operations including receiving a client copy of an audio file from a client device associated with a unified telephony call. The instructions may also cause the processor to compare the client copy of the audio file to a local copy of the audio file using a reference algorithm. A quality of service associated with the client device may be determined based upon, at least in part, a difference between the client copy of the audio file and the local copy of the audio file.

One or more of the following features may be included. Receiving the client copy of the audio file may include receiving a first client copy of the audio file from the client device at a first time, and receiving a second client copy of the audio file from the client device at a second time. Comparing the client copy of the audio file to the local copy of the audio file may include comparing first client copy of the audio file to the local copy of the audio file, and comparing the second client copy of the audio file to the local copy of the audio file. The reference algorithm may include a Perceptual Evaluation of Speech Quality algorithm.

Instructions may be included for associating a visual indicator with the quality of service, and transmitting the visual indicator to one or more client devices associated with the unified telephony call. If the quality of service is above a first threshold indicating a relatively high quality, the visual indicator may be indicative of a high quality of service. If the quality of service is below a second threshold indicating a relatively low quality, the visual indicator may be indicative of a low quality of service. If the quality of service is below the first threshold indicating the relatively high quality and above the second threshold indicating the relatively low quality, the visual indicator may be indicative of a medium quality of service. If the visual indicator is indicative of a low quality of service, a notification may be transmitted to the client device identifying a problem associated with the unified telephony call.

Instructions may be included for receiving, from the client device, failover connection information prior to joining the unified telephony call. Instructions may also be included for, in response to determining a low quality of service associated with client device, implementing the corrective measure includes establishing a failover connection based upon, at least in part, the failover connection information.

According to another implementation, a computing system includes a processor and memory that may be configured to perform operations including receiving a client copy of an audio file from a client device associated with a unified telephony call. The processor and memory may also be configured for comparing the client copy of the audio file to a local copy of the audio file using a reference algorithm. The processor and the memory may also be configured for determining a quality of service associated with the client device based upon, at least in part, a difference between the client copy of the audio file and the local copy of the audio file.

One or more or the following features may be included. Receiving the client copy of the audio file may include receiving a first client copy of the audio file from the client device at a first time, and receiving a second client copy of the audio file from the client device at a second time. Comparing the client copy of the audio file to the local copy of the audio file may include comparing first client copy of the audio file to the local copy of the audio file, and comparing the second client copy of the audio file to the local copy of the audio file. The reference algorithm may include a Perceptual Evaluation of Speech Quality algorithm.

The processor and memory may be further configured to perform operations including associating a visual indicator with the quality of service, and transmitting the visual indicator to one or more client devices associated with the unified telephony call. If the quality of service is above a first threshold indicating a relatively high quality, the visual indicator may be indicative of a high quality of service. If the quality of service is below a second threshold indicating a relatively low quality, the visual indicator may be indicative of a low quality of service. If the quality of service is below the first threshold indicating the relatively high quality and above the second threshold indicating the relatively low quality, the visual indicator may be indicative of a medium quality of service.

The processor and memory may further be configured to perform operations including receiving, from the client device, failover connection information prior to joining the unified telephony call. In response to determining a low quality of service associated with client device, the processor and memory may be configured for implementing the corrective measure including establishing a failover connection based upon, at least in part, the failover connection information.

According to another implementation, a computer-implemented method may include receiving, by a computing device, a copy of an audio file associated with a unified telephony call from a client device during the unified telephony call. A quality of service associated with the client device may be determined, wherein the quality of service may be determined based upon, at least in part, comparing the copy of the audio file received from the client device and a locally stored copy of the audio file using a full reference algorithm. If the quality of service falls below a threshold, a corrective measure may be executed.

According to another implementation, a method may include receiving, by a computing device, a copy of an audio file associated with a unified telephony call from a client device during the unified telephony call. A quality of service associated with the client device may be determined, wherein the quality of service associated with the client is determined based upon, at least in part, comparing the copy of the audio file received from the client device and a locally stored copy of the audio file using a full reference algorithm. A quality of service of the unified telephony call may be determined based upon, at least in part, the quality of service associated with the client device. At least one of the quality of service associated with the client device, the quality of service of the unified telephony call, and a status of a unified telephony infrastructure may be transmitted to one or more client devices associated with the unified telephone call.

The details of one or more implementations are set forth in the accompanying drawings and the description below. Other features and advantages will become apparent from the description, the drawings, and the claims.

DETAILED DESCRIPTION

As will be appreciated by one skilled in the art, aspects of the present invention may be embodied as a system, apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer (i.e., a client electronic device), partly on the user's computer, as a stand-alone software package, partly on the user's computer and partly on a remote computer or entirely on the remote computer or server (i.e., a server computer). In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and/or computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
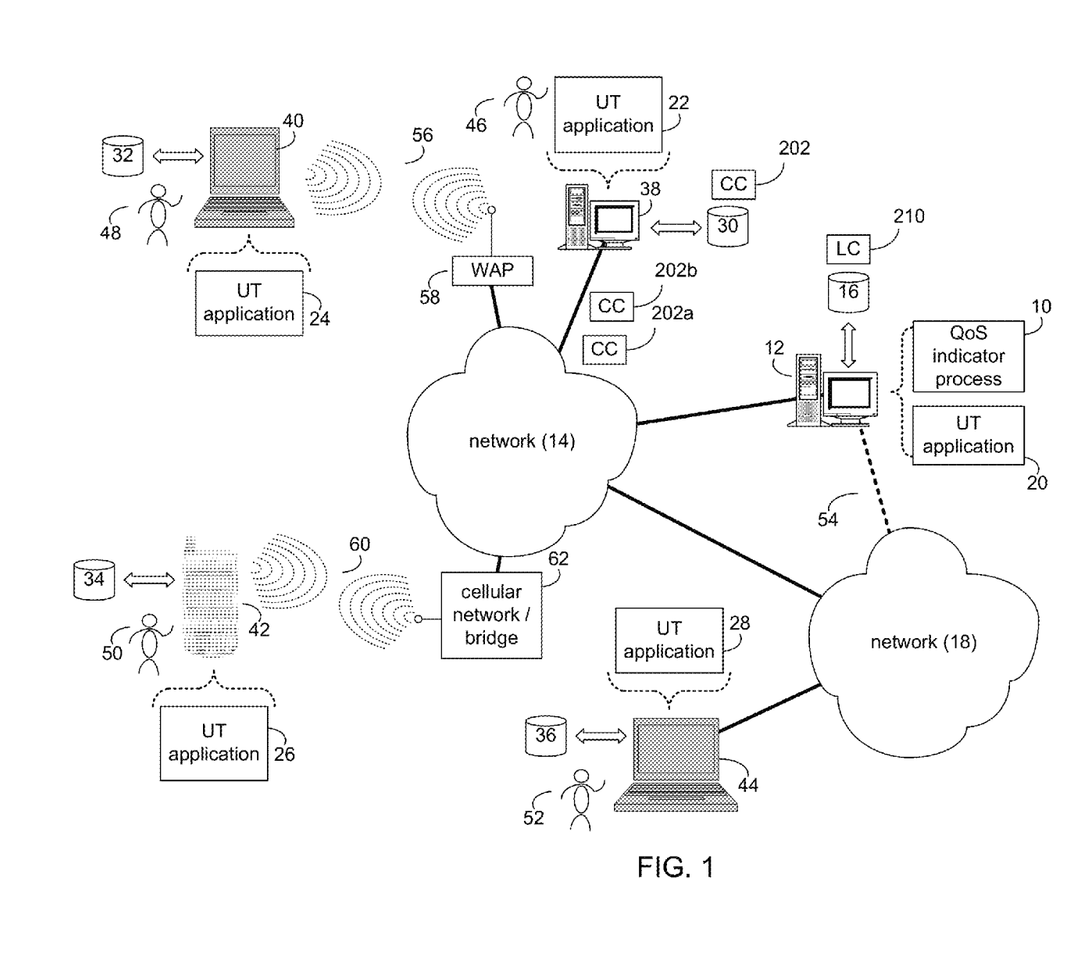
FIG. 1 is a diagrammatic view of a QoS indicator process coupled to a distributed computing network.

Referring to FIG. 1, there is shown QoS indicator process 10 that may reside on and may be executed by computer 12, which may be connected to network 14 (e.g., the Internet or a local area network). Examples of computer 12 may include but are not limited to a single server computer, a series of server computers, a single personal computer, a series of personal computers, a mini computer, a mainframe computer, or a computing cloud. The various components of computer 12 may execute one or more operating systems, examples of which may include but are not limited to: Microsoft Windows Server™; Novell Netware™; Redhat Linux™, Unix, or a custom operating system, for example.

As will be discussed below in greater detail, QoS indicator process 10 may receive a client copy of an audio file from a client device associated with a unified telephony call. The client copy of the audio file may be compared to a local copy of the audio file using a reference algorithm. A quality of service associated with the client device may be determined based upon, at least in part, a difference between the client copy of the audio file and the local copy of the audio file. In some embodiments, QoS indicator process 10 may compare the client copy of the audio file to the local copy of the audio file using a full reference algorithm. Examples of full reference algorithms may include, but are not limited to, Perceptual Evaluation of Speech Quality (PESQ), Perceptual Objective Listening Quality Assessment (POLQA), and Perceptual Evaluation of Video Quality (PEVQ).

The instruction sets and subroutines of QoS indicator process 10, which may be stored on storage device 16 coupled to computer 12, may be executed by one or more processors (not shown) and one or more memory architectures (not shown) included within computer 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

A unified telephony server application (e.g., UT application 20) may be executed by computer 12 and/or another computing device. An example of UT application 20 may include, but is not limited to, Sametime Unified Telephony Call Server. In general, UT application 20 may provide real-time communications services between unified telephony client applications (e.g., UT applications 22, 24, 26, 28). Examples of communication services provided by UT application 20 may include, for example, instant messaging services, IP telephony services, video conferences, unified messaging services, and the like. UT application 20 may, for example, establish communication channels and protocols for communication services and/or may route communications between users (e.g., via UT applications 22, 24, 26, 28) of the communication services.

The instruction sets and subroutines of UT application 20, which may be stored on storage device 16 of computer 12, may be executed by on one or more processors and one or more memory architectures included within computer 12. QoS indicator process 10 may include a module or component of UT application 20, and/or may include a standalone application that may communication and/or otherwise interact with UT application 20.

As discussed above, QoS indicator process 10 and/or UT application 20 may be accessed via unified telephony (UT) applications 22, 24, 26, 28. Examples of UT applications 22, 24, 26, 28 may include but are not limited to a standard web browser, a customized web browser, or a custom application. The instruction sets and subroutines of UT applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively).

Storage devices 30, 32, 34, 36 may include but are not limited to: hard disk drives; flash drives, tape drives; optical drives; RAID arrays; random access memories (RAM); and read-only memories (ROM). Examples of client electronic devices 38, 40, 42, 44 may include, but are not limited to, personal computer 38, laptop computer 40, smart phone 42, notebook computer 44, a server (not shown), a data-enabled, cellular telephone (not shown), and a dedicated network device (not shown).

In some embodiments, one or more of UT applications 22, 24, 26, 28 may be configured to provide some or all of the functionality of QoS indicator process 10. Accordingly, QoS indicator process 10 may be a purely server-side application, a purely client-side application, or a hybrid server-side/client-side application that is cooperatively executed by one or more of UT applications 22, 24, 26, 28 and QoS indicator process 10.

Users 46, 48, 50, 52 may access QoS indicator process 10 and/or UT application 20 directly through network 14 or through secondary network 18. Further, computer 12 may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Smart phone 42 is shown wirelessly coupled to network 14 via wireless communication channel 60 established between smart phone 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and smart phones to be interconnected using a short-range wireless connection. Client electronic devices 38, 40, 42, 44 may each execute an operating system, examples of which may include but are not limited to Apple iOS™, Microsoft Windows™, Android™, Redhat Linux™, or a custom operating systems.

For the purpose of explanation, client UT application 22 will generally be discussed in the context of one or more example embodiments. However such description should not be construed as a limitation, as other UT client applications (e.g., UT client applications 24, 26, 28) may be equally utilized.

Figure 2:
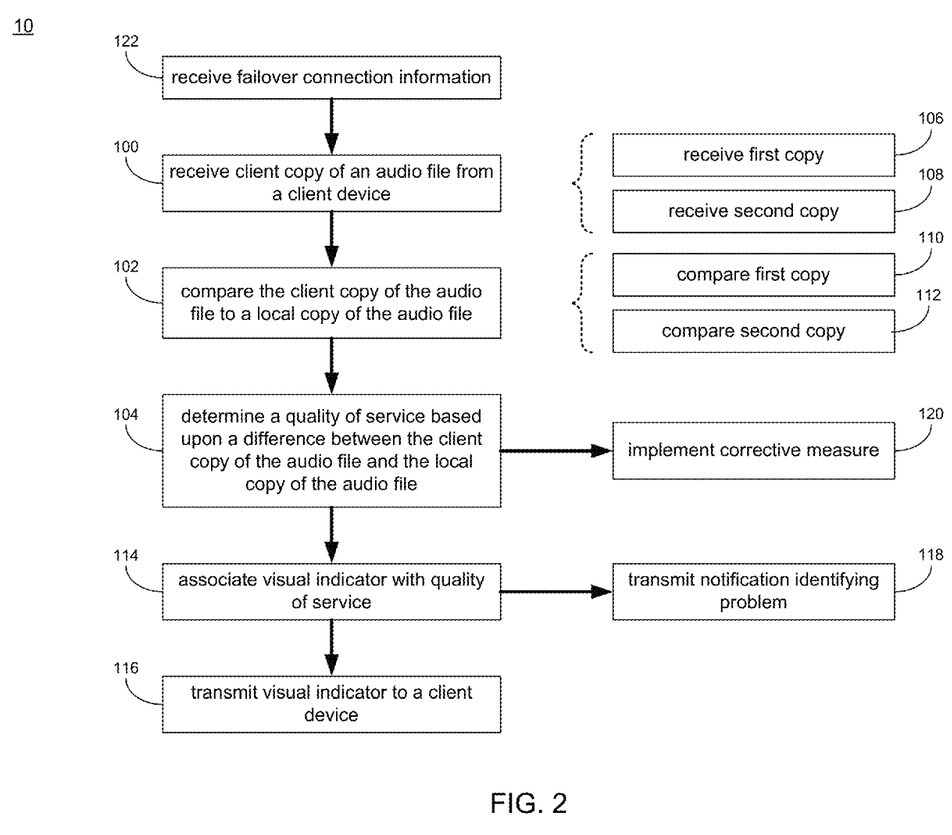
FIG. 2 is a flowchart of the QoS indicator process of FIG. 1.

Referring also to FIG. 2, and as generally discussed, QoS indicator process 10 may generally receive 100 a client copy of an audio file from a client device. QoS indicator process 10 may further compare 102 the client copy of the audio file to a local copy of the audio file. QoS indicator process 10 may determine a quality of service associated with the client device for the UT call based on a difference between the client copy of the audio file received 100 from the client device and the local copy of the audio file.

Accordingly, in some example embodiments, QoS indicator process 10 may generally allow quality of service in UT calls to be inferred based on real-time bi-directional exploitation a full reference algorithm. In some embodiments, the communication channel/connection associated with each participant of the UT call may contribute to the overall QoS of the conference call. Accordingly, the QoS of each communication channel/connection associated with a participant of the UT call may be measured to identify potential issues of the UT call. Potential issues that may contribute to a negative QoS of a UT call may include echo, audio level changes, background interference noise, and the like.

Figure 3:
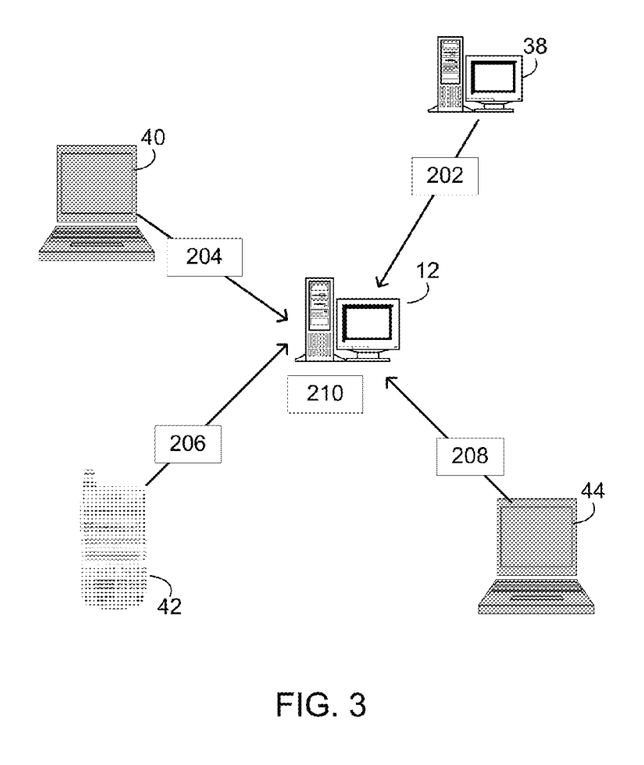
FIG. 3 is a diagrammatic view of an example unified telephony system that may utilize the QoS indicator process of FIG. 1; and Like reference symbols in the various drawings indicate like elements.

For example, and referring also to FIG. 3, an embodiment of a system for inferring quality in unified telephony calls based on real-time bi-directional exploitation of a full reference algorithm is diagrammatically depicted. In the example, client devices 38, 40, 42, 44 may each be associated with a UT system. Each of client devices 38, 40, 42, 44 may include a copy of a pre-recorded audio file (e.g., a client copy of the audio file 202, 204, 206, 208) stored thereon (e.g., stored on respective storage devices 30, 32, 34, 36). Further, server computer 12 may include a local copy of the pre-recorded audio file 210 stored thereon (e.g., stored on storage device 16). The client copy of the pre-recorded audio file 202, 204, 206, 208 and the local copy of the pre-recorded audio file 210 may collectively be referred to as the "pre-recorded audio file." In an embodiment, the pre-recorded audio file 202, 204, 206, 208, 210 may include an audio file that is not related to the UT call. In general, one or more client devices 38, 40, 42, 44 may transmit (e.g., via one or more of UT applications 22, 24, 26, 28) the client copy of the pre-recorded audio file 202, 204, 206, 208 over a network to QoS indicator process 10 and/or UT application 20. QoS indicator process 10 (e.g., which may reside on server 12) may receive 100 the client copies of the pre-recorded audio files 202, 204, 206, 208 and may compare 102 one or more of the client copies of the pre-recorded audio files 202, 204, 206, 208 to the local copy of the prerecorded audio file 210 to determine 104 a quality of service (QoS) of the connection/communication channel of the client devices with the server 12. In some embodiments, the QoS of the connection/communication channel of the client device may be determined using a full reference algorithm.

According to various embodiments, the client copy of the pre-recorded audio file 202, 204, 206, 208 may be substantially identical to and/or include a know difference to the local copy of the pre-recorded audio file 210. In some embodiments, the client copy of the pre-recorded audio file 202, 204, 206, 208 may be a copy of the local copy of the pre-recorded audio file 210. According to various embodiments, the client copy of pre-recorded audio file 202, 204, 206, 208 may have been transmitted to the respective client device 38, 40, 42, 44. In various additional/alternative embodiments, the client copy of the pre-recorded audio file may be otherwise transferred to and/or stored on the client devices (e.g., via physical media, or the like). In some embodiments, the pre-recorded audio file 202, 204, 206, 208, 210 may be relatively small in size. In some embodiments, the pre-recorded audio file 202, 204, 206, 208, 210 may be approximately one kilobyte of data. The pre-recorded audio file 202, 204, 206, 208, 210 may be generated by the QoS indicator process 10 and/or UT application 20. In some embodiments, the pre-recorded audio file 202, 204, 206, 208, 210 may be generated by a user or moderator of the UT system, wherein the pre-recorded audio file 202, 204, 206, 208, 210 may be a small file of spoken audio, to mimic the data of a UT call. In some embodiments, the client copy of the pre-recorded audio file 202, 204, 206, 208 may be have been transmitted to the respective client devices by the QoS indicator process 10 and/or UT application 20. The local copy of the pre-recorded audio file 210 may be stored on the server 12 (e.g., on storage device 16), which may be accessed by QoS indicator process 10.

For example, QoS indicator process 10 may receive 100 client copy of the pre-recorded audio file 202 from client device 38 (e.g., which may be transmitted by UT application 22) associated with user 46, who may be a participant in a unified telephony call. QoS indicator process 10 may compare 102 client copy of the pre-recorded audio file 202 to local copy of the pre-recorded audio file 210, and may determine 104 a quality of service associated with client device 38 based on, at least in part, a difference between copy of the pre-recorded audio file 202 and local copy of the pre-recorded audio file 210. For example, as client copy of the pre-recorded audio file 202 and local copy of the pre-recorded audio file 210 be substantially identical and/or may have known differences there-between, any differences (and/or additional differences) between client copy of the pre-recorded audio file 202 and local copy of the pre-recorded audio file 210 may be a result of any quality of service problems associated with the UT connection/communication channel associated with client device 38. QoS indicator process 10 may similarly receive 100 client copies of the pre-recorded audio file from one or more additional client devices (e.g., client devices 40, 42, 44) and/or participants in the UT call, and/may determine 104 a quality of service associated with the one or more additional client devices and/or participants in the UT call. Accordingly, in some embodiments, QoS indicator process 10 may determine a quality of service associated with each participant/client device in the UT call and/or each UT connection/communication channel associated with the UT call.

In some embodiments, comparing 102 the received 100 client copy of the pre-recorded audio file(s) to the local copy of the pre-recorded audio file may include the use of a full reference algorithm, which may analyze, e.g., voice quality, etc., based on a comparison between a signal being analyzed to an original reference signal. In an embodiment, the client copy of the pre-recorded audio file may be a copy of the local copy of the pre-recorded audio file. In such an embodiment, the received 100 client copy of the pre-recorded audio file may be the signal being analyzed, and the local copy of the pre-recorded audio file may be the reference signal that may be utilized for making the comparison. In an embodiment, QoS indicator process 10 may compare 102 the client copy of the pre-recorded audio file 202 to the local copy of the pre-recorded audio file 210 using a Perceptual Evaluation of Speech Quality (PESQ) algorithm. PESQ may include a family of standards that includes a test methodology for automated assessment of the speech quality as experienced by a user of a UT system. A QoS may be determined using a PESQ comparison. The quality of service may indicate a degree of loss, degree of degradation, degree of disimprovement of the call. Various additional and/or alternative full reference and/or other comparison algorithms may be equally utilized.

Accordingly, in some embodiments, the quality of service for each communication channel/connection may be determined using PESQ scoring based on the client copy of the pre-recorded audio file(s) received from each client device (e.g., client devices 38, 40, 42, 44) and the local copy of the pre-recorded audio file. As all of the pre-recorded audio files received from the client devices of the UT call may be identical, any quality of service issues associated with a UT communication channel may alter a characteristic of the pre-recorded audio file transmitted from the client device during the transmission. As such, the client copy of the pre-recorded audio file received at QoS indicator process 10 may be different than the local copy of the pre-recorded audio file (e.g., different by the altered difference) which may be determined based on the comparison of the two files. For example, although the two pre-recorded audio files should be identical, the transmitted pre-recorded audio files may not be identical to the stored pre-recorded audio file due to QoS issues in the UT communication channel/connection.

The client devices 38, 40, 42, 44 that are part of the UT call may transmit the client copy of the pre-recorded audio file 202, 204, 206, 208 to QoS indicator process 10 (e.g., residing on and executed by server 12). In some embodiments, the client copy of the pre-recorded audio file 202, 204, 206, 208 may be transmitted to QoS indicator process 10 in the background during the UT call. The client device(s) may transmit the client copy of the pre-recorded audio file periodically and/or intermittently throughout the duration of the call. In some embodiments, the client copy of the pre-recorded audio file 202, 204, 206, 208 may be periodically and/or intermittently transmitted to QoS indicator process 10 as a background payload of the UT communication via the UT communications channel/connection. In some embodiments, the client devices may transmit the client copy of the pre-recorded audio file 202, 204, 206, 208 to QoS indicator process 10 at pre-determined or pre-set time intervals. The pre-determined or pre-set time intervals may be based on one or more default settings and/or may be based on one or more preferences set by a moderator or by a system administrator of the UT system. In some embodiments, the client devices may transmit the client copy of the pre-recorded audio file 202, 204, 206, 208 to the server 12 every 15-20 seconds.

In an embodiment in which one or more client devices may intermittently and/or periodically transmit the client copy of the pre-recorded audio file, QoS indicator process 10 may make on ongoing comparison between the client copy of the pre-recorded audio file and the local copy of the pre-recorded audio file, thereby allowing QoS indicator process 10 to make on ongoing determination 104 of the quality of service associated with one or more client devices and/or UT connections/communication channels. Consistent with such an embodiment, receiving 100 client copy of the audio file may include receiving 106 a first client copy of the audio file 202a from the client device at a first time, and receiving 108 a second client copy of the audio file 202b from the client device at a second time. For example, first client copy of the audio file 202a and the second copy of the audio file 202b may be copies of the same file (e.g., client copy of the pre-recorded audio file 202) transmitted at different times. Additional copies of the client copy of the pre-recorded audio file 202 may be intermittently and/or periodically transmitted by the client device and/or UT application, and may be received 100 by QoS indicator process 10.

Continuing with the above example in which client copies of the pre-recorded audio file may be intermittently and/or periodically received 100 from the client device, comparing 102 the client copy of the audio file to the local copy of the audio file may include comparing 110 the first client copy of the audio file 202a to the local copy of the audio file 210, and may include comparing 112 the second copy of the audio file 202b to the local copy of the audio file 210. Accordingly, in each instance comparing 102 the intermittently and/or periodically received client copy of the audio file may include comparing the received audio file to the local copy of the audio file. Accordingly, QoS indicator process 10 may compare the intermittently and/or periodically received client copy of the pre-recorded audio file to the local copy of the pre-recorded audio file on a generally ongoing base, e.g., to thereby determine 104 a quality of service associated with a client device and/or UT connection/communication channel on a generally ongoing basis. By continuously determining the quality of service of a communication channel/connection of a user throughout the UT call, QoS indicator process 10 may provide real-time and/or near real-time quality of service information of the UT call to all participants.

In some embodiments, QoS indicator process 10 may determine 104 a quality of service associated with a device in a unified telephony call, e.g., intermittently and/or on a periodic basis. QoS indicator process 10 may associate 114 visual indicators corresponding to the QoS determined for one or more connection/communication channel in the UT conference call. In some embodiments, QoS indicator process 10 may transmit 116 the visual indicators to each of the participants (e.g., to UT applications and/or client devices utilized by participants) of the UT conference call over the network. In some embodiments, QoS indicator process 10 may transmit 116 the visual indicators to a non-participant moderator or administrator (e.g., to a UT application and/or client device utilized by a non-participant moderator or administrator) of the UT conference call.

For example, participants 46, 48, 50, 52 may join a UT call using client devices 38, 40, 42, 44. In some embodiments, the devices used to join the call may all be part of a unified telephony system. In some embodiments, some of the devices used to join the call may be part of a unified telephony system, while other devices may not be part of the UT system. The participants 46, 48, 50, 52 may join a call by a dialing a provided dial-in phone number for a conference call. In some embodiments, UT server application 20 may receive the incoming calls and bridge the calls together into a conference call.

Based on a determined 104 quality of service associated with each channel (e.g., which may be associated with a participant and/or client device), QoS indicator process 10 may associate 114 an appropriate visual indicator with each channel, participant, and/or client device. In some embodiments, QoS indicator process 10 may associate 114 a color or other visual indicator of the quality of service of the call. In some embodiments, one or more client devices associated with participants in the call may not be a part of the UT system. Accordingly, in some instances QoS indicator process 10 may not be able to determine the quality of service of the connection/communication channel associated with one or more client devices, as the client devices may not transmit a client copy of the pre-recorded audio file to be used in the PESQ comparison. If the caller is not part of the UT system (e.g., if the caller is using a communication device and/or communication application that is not configured to communicate with the QoS indicator process 10), then QoS indicator process 10 may not be able to determine a quality of service connection/communication channel and therefore would not be able to associate a visual indicator with the connection/communication channel. In some embodiments, QoS indicator process 10 may associate 114 a visual indicator with a participant, indicating the participant is not part of the UT system. For example, QoS indicator process 10 may associate 114 the color gray with the participant and may transmit 116 the visual indicator to the client devices of the UT call. This may indicate that the caller is participating in the UT call but quality of service information associated with the participant could not be determined.

The visual indicators may be based on a QoS of a communication channel/connection associated with a client device that a particular user may utilized for the purpose of participating in a UT call, but for the purposes of communicating the quality of service status of the communication channel/connection of the user, the visual indicator may be associated 114 with a caller (e.g., indicating the quality of service associated with the communication channel that the caller is using).

In some embodiments, QoS indicator process 10 may associate a visual indicator based on the quality of service of each connection/communication channel associated with a participant based upon, at least in part, one or more thresholds for high quality and low quality. The threshold may be predetermined. The threshold hold may be generated and/or modified in response to an input from a moderator or UT system administrator. In some embodiments, QoS process 10 may associate 114 a visual indicator of the quality of service of each call that may be indicative of the quality of service of the call relative to the threshold. For example, QoS indicator process 10 may associate 114 a visual indicator having a green color with a participant if the quality of service of the call is above a threshold indicating a relatively high quality of service for the call. QoS indicator process 10 may associate 114 a visual indicator having a red color with a participant if the quality of service of the call is below a threshold indicating a relatively low quality of service for the call. QoS indicator process 10 may associate 114 a visual indicator having a yellow color with a participant if the quality of service of the call is below the threshold indicating relatively high quality and above the threshold indicating relatively low quality. The use of color based visual indicators, and the above-described colors associated with such color based visual indicators, are intended for the purpose of illustration only. Various additional/alternative colors and/or visual indicators may be equally utilized.

In an embodiment, QoS indicator process 10 may transmit 116 the visual indicators associated with each participant to all participants on the call. QoS indicator process 10 may transmit 116 the visual indicators over a network 14 to UT applications 22, 24, 26, 28 associated with participants. In some embodiments, the visual indicators of the quality of service of calls may be transmitted to a separate server or the UT server application 20.

As generally described above, in some embodiments, the visual indicator of the QoS of calls may be transmitted to computing device associated with a moderator. In some embodiments, the moderator may be the organizer of the UT conference call. In some embodiments, the moderator may not be a participant of the UT conference call, but may be an individual who monitors the QoS of the call. The moderator may control and resolve identified QoS issues. In some embodiments, the participants of the UT call may be able to establish or identify the owner(s) of the QoS problems and take measures to correct the problem.

In some embodiments, participants of the UT call may be classified into categories or "buckets." Bucket 1 may represent the individuals who do not have any QoS issues (i.e., individuals associated with UT communications channels/connections not experiencing QoS issues and/or experiencing QoS issues deemed to be negligible). Bucket 2 may represent users who may have some QoS issues, but the QoS issues are deemed to be acceptable (i.e., individuals associated with UT communications channels/connections experiencing moderate levels of QoS issues, greater than the QoS issues experienced by users in bucket 1). Bucket 2 may have configuration parameters associated with it to allow a moderator to establish preferences and thresholds on acceptability. For example, the moderator may indicate that some background noise is acceptable, whereas if the background noise exceeds the parameter, the QoS issue is not longer acceptable. Bucket 3 may represent problem users, whose QoS problems rise to a level of interference deemed to negatively impact the quality of the call (i.e., individuals associated with UT communications channels/connections experiencing QoS issues above a threshold). In some embodiments, the buckets may be associated with a visual indicator, as described above. For example, bucket 1 may be associated with a visual indicator that is green, bucket 2 may be associated with a visual indicator that is yellow, and bucket 3 may be associated with a visual indicator that is red.

In some embodiments, if a participant is associated with a red visual indicator and/or bucket 3, a notification may be transmitted to all the participants of the call, identifying a relatively low QoS of the communication channel/connection which may indicate potential issues associated with the communication channel/connection associated with the user. In some embodiments, the notification may also be transmitted to a third-party moderator (e.g., user not participating in the UT call, but monitoring the quality of the call). In some embodiments, participants and/or the moderator of the UT call may receive notifications for all users associated with a red visual indicator and/or bucket 3, identifying a relatively low QoS of a particular communication channel/connection associated with a participant. In some embodiments, the notification may also include one or more possible corrective measures that may rectify the QoS issues associated with the caller. In some embodiments, participants and/or the moderator of the UT call may receive notifications for all users associated with the yellow visual indicator and/or bucket 2 indicating that the users associated with the yellow visual indicator and/or bucket 2 may be trending towards QoS issues. In some embodiments, the notification may include a message that if the user changes from the yellow to red and/or bucket 2 to bucket 3, the user may be disconnected from the UT call to preserve the quality of the UT conference call. Participants of the UT conference call may not receive notifications for users associated with the green visual indicator and/or bucket 1. In some embodiments, the notification may be a single notification comprising a status of all the participants of the call. In some embodiments, the notifications may be a single notification for all participants associated with a particular bucket or visual indicator. In some embodiments, the notifications may be a notification for each of the participants associated with a particular bucket or visual indicator.

In some embodiments, the participants of the call may alternate between the buckets during the call. The classification into buckets may be updated during the intermittent and/or periodic determination 104 of QoS of a participants call. One common example of when users may alternate between buckets includes when a participant is on a cellular device while driving. As the participant moves, their reception for the call may continuously change. As the movement of the participant may affect the QoS of the call, QoS indicator process 10 may intermittently/periodically determine 104 the QoS of the call and response to each determination, the participant may alternate between the designated buckets.

In some embodiments, QoS indicator process 10 may provide the moderator with a real-time and/or near real-time point in time understanding as to a status of each participant from a QoS perspective, assessing each participant's impact to the quality of the UT conference call. The moderator may motivate corrective actions (e.g., ask specific participants to go on mute as opposed to asking everyone who is not talking to go on mute). QoS indicator process 10 may automatically implement 120 corrective measures (e.g., based on one or more configurations or preference settings associated with QoS indicator process 10). Similarly, participants on a call can establish knowledge about their own session quality, affording them the opportunity to motivate a correction at an opportune time (e.g., disconnect from mobile phone and re-connect on a land-line). For example, a participant in Bucket 3 may receive a passive notification from QoS indicator process 10 that they are causing a problem, to motivate a correction. The moderator may also motivate such a notification or correction if not automatic.

In some embodiments, QoS indicator process 10 may provide a visual tab in a UT call. The visual tab may bring users to a user interface page that displays all participants of the call and the bucket with which they are associated. The user interface page displaying participants and associate buckets may provide a simple visual display of the three categories, with names in each category, that may, in some embodiments, be automatically kept up-to-date in real time and/or near real-time.

In one embodiment, the QoS indicator process 10 may permit the moderator to set rules. For example, the moderator may generate a rule in which any users in Bucket 3 may be automatically muted and may remain on mute with appropriate notifications to participants of the UT conference call to make them aware of that status. Users in Bucket 2 may be muted until such time that they want to speak, whereupon they may need to un-mute themselves. Users in Bucket 1 may have an open line without any imposition of corrective measures. Exceptions to the rules generated by the moderator may be applied to particular participants or groups of participants, such as senior personnel or executives. When the user alternates between buckets they may receive notification from QoS indicator process 10 regarding their status. For example, if a participant is on a cell phone and coverage wanes to a poor QOS, then QoS indicator process may notify them, as well as others on the call, that there may be a potential problem on the call.

In some embodiments, the QoS indicator process 10 may manage the above described functions in real time and/or in near real-time, so it may drive notifications, prompts to correct, and auto-mutes participants on an as-needed basis.

In some embodiments, QoS indicator process 10 may automatically implement 120 corrective measures for participants of a UT conference. In some embodiments, QoS indicator process 10 may implement 120 corrective measures based on, at least in part, a particular visual indicator or bucket (or other classification) associated with a call participant. For example, QoS indicator process 10 may detect problems such as echo, audio level changes, background interference noise, and the like. The QoS indicator process 10 may implement 120 a corrective measure, such as muting participants with the QoS issues affecting the UT call.

In some embodiments, QoS indicator process 10 and/or UT application 20 may implement 120 a corrective measure in the form of a failover connection or communication channel. For example, a failover connection may allow a connection/communication channel of the UT call experiencing QoS issues to be replaced with the failover connection, e.g., which may provide a better quality of service. For example, in some embodiments, participants of a call may provide failover connection information, such as an alternative phone number, prior to joining the UT call. The failover connection information may be received 122 by QoS indicator process 10. For example, a participant may call from a work device, but prior to joining the UT call, QoS indicator process 10 may allow the participant to provide the phone number of another device, such as a cell phone or different client device. QoS indicator process 10 may receive 122 the failover connection information from the participant. Further, QoS indicator process 10 may use the provided failover connection information, such as the alternative number, when implementing 120 corrective measures (e.g., which may include providing a failover connection for one or more participants) to increase the overall quality of the UT conference call. For example, if the QoS of a participant's call indicates that the call quality is poor, the moderator or QoS indicator process 10 may establish an alternative connection/communication channel using another device. For example, upon determining a connection of the UT call has poor QoS, QoS indicator process 10 may establish a connection/communication channel via the other device by automatically calling the other device. In some embodiments, prior to QoS indicator process 10 implementing 120 a corrective measure of using the alternative number, QoS indicator process 10 may transmit a notification to the participant indicating the corrective measure to be taken includes connecting the participant to the conference call using the alternative number. In some embodiments, the participant may choose to accept the corrective measure or to decline the corrective measure.

In some embodiments, QoS indicator process 10 may provide a UT dashboard which may display the real-time QoS service monitoring. The dashboard may display network characteristics of the UT system infrastructure which can then be used to infer what impact the underlying network infrastructure state has on the QoS of the UT system. In some embodiments, the dashboard may correlate QoS issues across multiple calls. The dashboard may provide system-wide QoS at a glance, while also providing the ability to pinpoint QoS trouble spots of one or more on-going UT conference calls.

For example, if there is a large conference call in progress (e.g., 100 users), and the users begin to experience QoS issues, the dashboard may alert the administrator in real time and/or near real-time that there is an issue with that call. Using real-time correlation, QoS indicator process 10 may determine if the QoS issues are localized to that particular call or if there is some underlying issue with the UT infrastructure. In some embodiments, the dashboard may display a summary of overall QoS of the system and may provide the administrator and/or moderator the ability to drill down into specific areas and/or calls to obtain more detail of QoS trouble spots. In some embodiments, the dashboard may outline how the UT server 12 and related network manages the UT conference calls. In some embodiments, the dashboard may display how the underlying network layer of the UT system behaves with respect to the QoS totality. In some embodiments, the UT administrator and/or moderator may infer what network traffic flows impact the QoS of unified telephony calls.

In some embodiments, the dashboard may provide tools allowing the administer and/or moderator of the UT system to see an overall view of UT system, correlate failures across multiple calls and server subsystems, and view real-time network characteristics going to and from the UT system. QoS indicator process 10 may determine if the underlying network pipe is providing adequate data flows to facilitate optimum QoS. In some embodiments, the dashboard may provide a visualization of the QoS system health through QoS indicators. Examples of QoS system health indicators may include a red indicator indicating fatal QoS issues of the system, a yellow indicator indication QoS issues that require attention, and a green indicator that indicates there are no QoS issues in the UT system. The in some embodiments, QoS indicator process 10 may provide a drop down, within the dashboard, to a lower level to determine what specific calls exhibit QoS issues. Examples of the lower level details may include user location, large multi-party calls, and the like. For example, if a UT system administrator and/or moderator is managing a UT system having thousands of calls running through the UT system, using the dashboard, they may be able to determine, at a glance, the overall QoS of the UT system. If the QoS of the system indicates a red or yellow status, the administrator and/or moderator may have the ability to drop down to a lower level (a level with more detail) to determine which calls are contributing to the lower QoS of the system.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
  receiving, by a computing device, a client copy of an audio file from a client device associated with a unified telephony call of a plurality of unified telephony calls within a unified telephony system;
  comparing, by the computing device, the client copy of the audio file to a local copy of the audio file using a reference algorithm;
  determining, by the computing device, a quality of service associated with the client device based upon, at least in part, a difference between the client copy of the audio file and the local copy of the audio file;
  associating, by the computing device, a visual indicator with the quality of service, wherein the visual indicator includes a color associated with the quality of service associated with each client device associated with the unified telephony call;
  transmitting, by the computing device, the visual indicator to each client device associated with the unified telephony call;

receiving, from the client device, failover connection information prior to joining the unified telephony call;
if the quality of service falls below a threshold, establishing a failover connection using a different device based upon, at least in part, the failover connection information received from the client device;
if the quality of service falls below the threshold, implementing a corrective measure; and
providing, by the computing device, a visual display of a summary of overall quality of service for the unified telephony system including a quality of service associated with each of the plurality of unified telephony calls.

2. The computer-implemented method of claim 1, wherein:
receiving the client copy of the audio file includes receiving a first client copy of the audio file from the client device at a first time, and receiving a second client copy of the audio file from the client device at a second time; and
wherein comparing the client copy of the audio file to the local copy of the audio file includes comparing first client copy of the audio file to the local copy of the audio file, and comparing the second client copy of the audio file to the local copy of the audio file.

3. The computer-implemented method of claim 1, wherein the reference algorithm includes a Perceptual Evaluation of Speech Quality algorithm.

4. The computer-implemented method of claim 1, wherein:
if the quality of service is above a first threshold indicating a relatively high quality, the visual indicator is indicative of a high quality of service;
if the quality of service is below a second threshold indicating a relatively low quality, the visual indicator is indicative of a low quality of service; and
if the quality of service is below the first threshold indicating the relatively high quality and above the second threshold indicating the relatively low quality, the visual indicator is indicative of a medium quality of service.

5. The computer-implemented method of claim 4, further comprising transmitting the visual indicator to a second client device associated with a moderator.

6. The computer-implemented method of claim 4, further comprising: if the visual indicator is indicative of a low quality of service, transmitting a notification to the client device identifying a problem associated with the unified telephony call.

7. A computer-implemented method comprising:
receiving, by a computing device, a copy of an audio file associated with a unified telephony call from a client device during the unified telephony call, wherein the unified telephony call is one of a plurality of unified telephony calls within a unified telephony system;
determining, by the computing device, a quality of service associated with the client device, wherein the quality of service is determined based upon, at least in part, comparing the copy of the audio file received from the client device and a locally stored copy of the audio file using a full reference algorithm;
receiving, from the client device, failover connection information prior to joining the unified telephony call;
if the quality of service falls below a threshold, executing, by the computing device, a corrective measure, including establishing a failover connection using a different device based upon, at least in part, the failover connection information received from the client device;
associating a visual indicator with the quality of service, wherein the visual indicator includes a color associated with the quality of service associated with each client device associated with the unified telephony call;
transmitting the visual indicator to each client device associated with the unified telephony call; and
providing, by the computing device, a visual display of a summary of overall quality of service for the unified telephony system including a quality of service associated with each of the plurality of unified telephony calls.

8. A computer-implemented method comprising:
receiving, by a computing device, a copy of an audio file associated with a unified telephony call from a client device during the unified telephony call, wherein the unified telephony call is one of a plurality of unified telephony calls within a unified telephony system;
determining, by the computing device, a quality of service associated with the client device, wherein the quality of service associated with the client is determined based upon, at least in part, comparing the copy of the audio file received from the client device and a locally stored copy of the audio file using a full reference algorithm;
determining, by the computing device, a quality of service of the unified telephony call based upon, at least in part, the quality of service associated with the client device;
transmitting, by the computing device, at least one of the quality of service associated with the client device, the quality of service of the unified telephony call, and a status of a unified telephony infrastructure to one or more client devices associated with the unified telephone call;
associating a visual indicator with the quality of service, wherein the visual indicator includes a color associated with the quality of service associated with each client device associated with the unified telephony call;
transmitting the visual indicator to each client device associated with the unified telephony call;
receiving, from the client device, failover connection information prior to joining the unified telephony call;
if the quality of service associated with the client device falls below a threshold, executing, by the computing device, a corrective measure, including establishing a failover connection using a different device based upon, at least in part, the failover connection information received from the client device; and
providing, by the computing device, a visual display of a summary of overall quality of service for the unified telephony system including a quality of service associated with each of the plurality of unified telephony calls.

* * * * *